(12) United States Patent
Rober (10) Patent No.: US 6,934,665 B2
(45) Date of Patent: Aug. 23, 2005

(54) ELECTRONIC SENSOR WITH SIGNAL CONDITIONING

(75) Inventor: Stephen J. Rober, Arlington Heights, IL (US)

(73) Assignee: Motorola, Inc., Schaumburg ( * ) Notice: Subject to any disclaimer, the term of this patent is extended or adjusted under 35 U.S.C. 154(b) by 41 days.

(21) Appl. No.: 10/691,306

(22) Filed: Oct. 22, 2003

(65) Prior Publication Data

US 2005/0091006 A1 Apr. 28, 2005

(51) Int. Cl.$^7$ .......................... G06F 19/00; G01C 19/00
(52) U.S. Cl. .................. 702/189; 73/503.3; 73/504.02; 73/504.04; 331/1 R; 331/19; 331/44
(58) Field of Search ............................ 702/76, 77, 189; 73/503.3, 504.02, 504.04, 504.12; 331/1 R, 19, 44

(56) References Cited

U.S. PATENT DOCUMENTS

| | | | |
|---|---|---|---|
| 5,387,253 A | * | 2/1995 | Remboski et al. .......... 73/117.3 |
| 5,400,644 A | * | 3/1995 | Remboski et al. .......... 73/35.04 |
| 5,481,914 A | * | 1/1996 | Ward .......................... 73/504.16 |
| 5,515,720 A | * | 5/1996 | Remboski et al. ............ 73/116 |
| 5,576,976 A | * | 11/1996 | White .......................... 702/190 |
| 5,600,064 A | * | 2/1997 | Ward .......................... 73/504.04 |
| 5,604,309 A | * | 2/1997 | Ward .......................... 73/488 |
| 5,608,351 A | * | 3/1997 | Ward .......................... 330/107 |
| 5,672,949 A | * | 9/1997 | Ward .......................... 318/609 |
| 5,703,292 A | * | 12/1997 | Ward .......................... 73/504.02 |
| 5,841,025 A | * | 11/1998 | Remboski et al. .......... 73/117.3 |
| 5,889,193 A | | 3/1999 | Pfaff et al. |
| 6,205,838 B1 | | 3/2001 | Schmid et al. |
| 6,311,555 B1 | * | 11/2001 | McCall et al. ................ 73/488 |
| 6,324,910 B1 | | 12/2001 | Funk et al. |
| 6,386,032 B1 | * | 5/2002 | Lemkin et al. .......... 73/504.02 |
| 6,456,939 B1 | * | 9/2002 | McCall et al. .............. 701/220 |
| 6,462,566 B1 | | 10/2002 | Schoefthaler |
| 6,494,093 B2 | * | 12/2002 | McCall et al. ................ 73/497 |
| 6,508,122 B1 | * | 1/2003 | McCall et al. ........... 73/504.12 |
| 6,651,027 B2 | * | 1/2003 | McCall et al. .............. 702/141 |
| 6,556,929 B1 | | 4/2003 | Kleinhans et al. |
| 6,590,460 B1 | | 7/2003 | Tenten et al. |
| 6,789,029 B2 | * | 9/2004 | Rober .......................... 702/76 |
| 2004/0078159 A1 | * | 4/2004 | Rober .......................... 702/76 |

* cited by examiner

*Primary Examiner*—Patrick J. Assouad
(74) *Attorney, Agent, or Firm*—Brian M. Mancini; Thomas V. Miller (57) ABSTRACT

A method for extracting components from signals in an electronic sensor (50) having a sensing element (52). The sensing element (52) generates a first signal (60) and a second signal (62). The method comprises the steps of: receiving the first signal (60) from the sensing element (52), the first signal (60) having a frequency at an event; sampling the second signal (62) from the sensing element (52) based on the frequency of the event, the second signal (62) having a plurality of components, one of the plurality of components being a first component of interest (112, 114); generating a synchronized second signal (100) in a time domain, the second signal (62) having the plurality of components; generating complex data (110) in a frequency domain from the synchronized second signal (100) in the time domain; determining the first component of interest (112, 114) from the complex data (110); and normalizing the first component of interest (112, 114) using amplitude information from the first signal (60).

20 Claims, 8 Drawing Sheets

ELECTRONIC SENSOR WITH SIGNAL CONDITIONING

FIELD OF THE INVENTION

This invention in general relates to an electronic sensor and, more particularly, to signal processing in an electronic sensor such as a gyroscope.

BACKGROUND OF THE INVENTION

Electronic sensors manufactured by microelectromechanical systems (MEMS) technology are playing key roles in many areas. For instance, microelectro-mechanical gyroscopes have enabled several important control systems in transportation and commercial applications. Other microdevices such as pressure sensors, accelerometers, actuators, and resonators fabricated by MEMS technology are also used in many areas.

In the area of micro gyroscopes, there is a need to provide improved techniques to extract accurate components of interest from signals such as a signal component that is indicative of an angular rate that was externally induced to the gyroscope. One type of micro gyroscope contains two movable proof masses. The proof masses are vibrated in the same plane (in-plane) at a predetermined frequency by a motor in the gyroscope. The motor may include electrodes that drive the proof masses in the same plane in an oscillatory manner. The oscillation of the proof masses is controlled to a frequency near the resonant frequency of the proof masses.

In addition to a set of proof masses and drive electrodes, the gyroscope also contains sensing electrodes around the proof masses that report signals indicative of the movement of each proof mass. In particular, certain electrodes sense the in-plane movement of the proof masses. Other electrodes sense the out-of-plane movement of the proof masses. With appropriate signal processing and extraction circuitry, an angular rate component can be recovered from the reported signal of the electrodes sensing the out-of-plane movement of the proof masses.

A variety of techniques have been applied to extract a signal of interest in a gyroscope. These techniques, however, are limited in accuracy, reliability, and cost. In particular, the angular rate component of a signal from the out-of-plane electrodes must be isolated and extracted from several extraneous components such as the motor drive feedthrough, a quadrature component, the resonance of the motor drive feedthrough, and other system resonance and noise. Some of these extraneous components can be greater than the angular rate component. Moreover, the angular rate component of the signal varies considerably in magnitude and frequency over a full operating range of the gyroscope. There is also a variation from device to device that affects the relationship of the angular rate component to other components in the signal.

Figure 1:
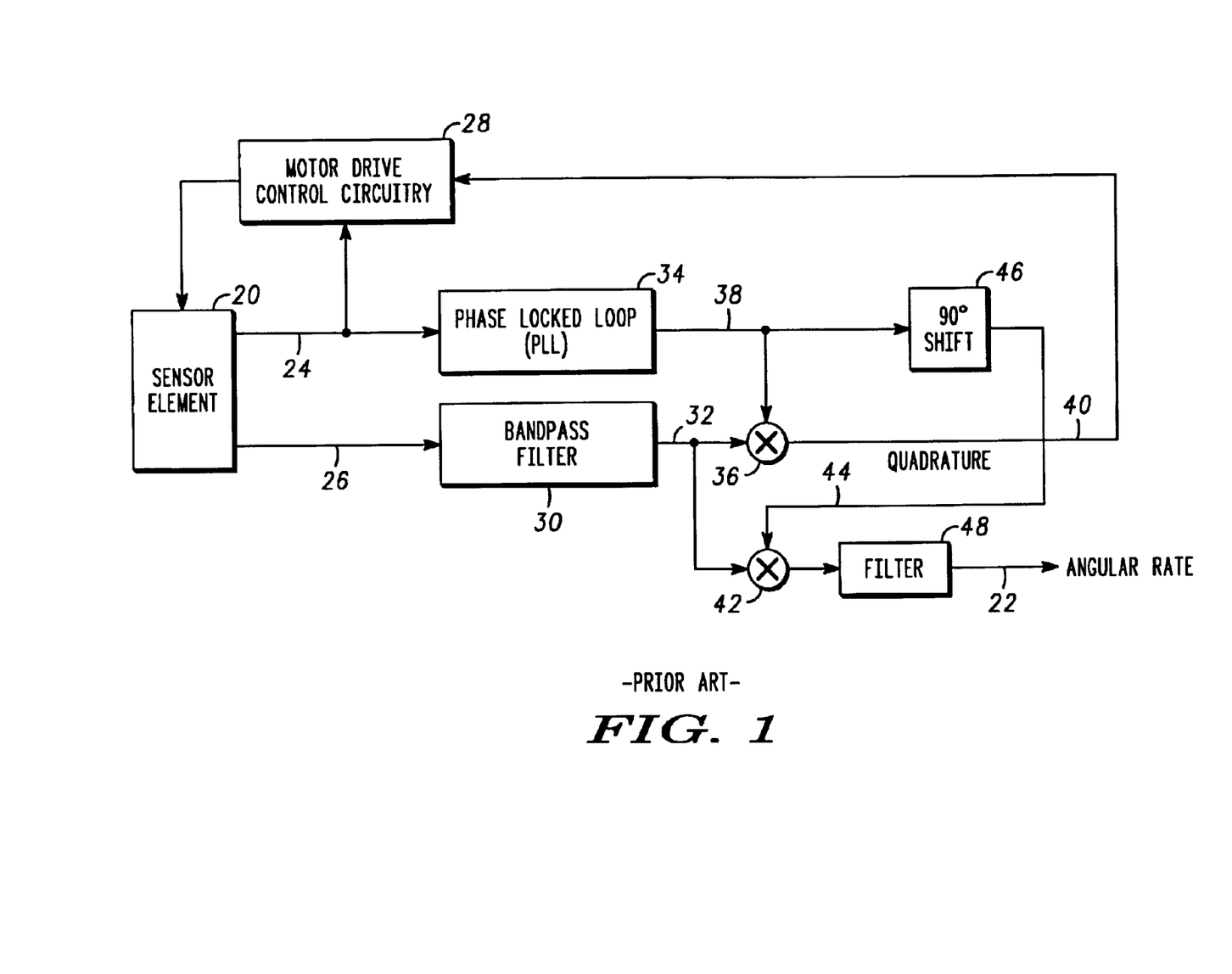
FIG. 1 is a block diagram of a system for extracting an angular rate from a sensing element according to the prior art.

Current schemes to isolate and extract a signal from the gyroscope use a dual windowing scheme to extract the angular rate externally induced to the device. For instance, one technique known for extracting a reported angular rate signal 22 from a gyroscope element 20 is shown in FIG. 1. In this technique, two signals 24, 26 are generated from the gyroscope element 20. The first signal 24 is reported from electrodes that are in the same plane as the proof masses (in-plane electrodes). The first signal 24 is indicative of the oscillation of the gyroscope moving in an in-plane motion. One use of the first signal 24 is for motor drive control circuitry 28 to provide a control loop that maintains the oscillation of the proof masses to a frequency near the resonant frequency of the proof masses. The second signal 26 is reported from the electrodes that are not in the same plane as the proof masses (out-of-plane electrodes). The second signal 26 contains a signal component that is representative of the angular rate that is being externally induced on the gyroscope element 26. The second signal 26, however, also contains other extraneous signal components.

In this case, the signal processing circuitry includes a bandpass filter 30 that receives the second signal 26 and allows certain signal components that fall within a selected range of frequencies to pass through the filter. The output of the bandpass filter 30 is a complex filtered second signal 32, in the time domain, that contains an angular rate component and a quadrature component. The angular rate component of the complex filtered second signal 32 is one of the signal components of interest of the gyroscope. The quadrature component of the complex filtered second signal 32 is an error caused by the drive force of the gyroscope when it oscillates out-of-plane in an elliptical manner. The angular rate component and the quadrature component are offset by ninety degrees.

The system here uses a dual windowing scheme that includes the generation of two windows. The two windows are generated by a phase locked loop 34. The windows are set at ninety-degrees out of phase from each other in order to capture the two signal components. In particular, the quadrature component can be extracted by inputting the complex filtered second signal 32 to a first multiplier 36. The first multiplier 36 demodulates the complex filtered second signal 32 by multiplying the complex filtered signal 32 by a reference signal 38 that is a function of the first signal 24. The reference signal 38 is essentially a reference sinusoid that includes the in-plane signal amplitude and the resonant frequency of the proof masses. The reference signal 38 is generated from the phase locked loop 34. The output of the first multiplier 36 provides a calculated quadrature signal 40 that can be sent to the motor drive control circuitry 28.

The angular rate component can be extracted by inputting the complex filtered second signal 32 to a second multiplier 42. The second multiplier 42 demodulates the complex filtered second signal 32 by multiplying the filtered signal 32 by a phase shifted signal 44 that is ninety-degrees from the reference signal 38. The phase-shifted signal 44 is derived by coupling the reference signal 38 to a ninety-degree phase shifter 46. The output of the second multiplier 42 provides the reported angular rate signal 22 indicative of the rotational rate externally induced to the gyroscope element 20. A low pass filter 48 may be used to remove any further signal components with a high frequency.

This type of system, however, has limitations. For example, the system requires a very precise narrow bandpass filter. The use of a narrow bandpass filter passes only the signal components within an expected range of frequencies. Using a narrow bandpass filter requires that the windows be delayed to match the delay of the signal induced by the filter. If a band rejection filter is used, then the quadrature and the rate signals may contain elements of the noise, and the final values are susceptible to DC offsets of the signal. Moreover, the system does not account for variations from device to device that may affect the relationship of the angular rate.

In addition, angular rate sensors are vulnerable to disturbances from road conditions or parameter drift. When disturbances or parameter changes affect the amplitude of oscillation of the angular rate sensor, the resultant change in the rate signal due to the Coriolis Effect may be interpreted as a change in the angular rate of the vehicle itself. Prior art sensors do not account for changes for the amplitude of oscillation. Adaptive filtering may be used but this technique is only applicable for correcting slowly varying properties of the sensor and requires tuning.

Another problem is fault detection. Angular rate sensors are used for safety critical systems. There is a need to continuously monitor the functionality of the whole sensor, e.g. the sensor element, ASIC's, electronics, and software, to ensure proper operation at all times. It is generally undesirable to take a sensor offline to perform diagnostic tests as is done in the prior art. Further, it would be of benefit to eliminate estimations for fault detection due to the critical nature of the sensor.

A need exists for an improved system for extracting an accurate angular rate component from the output signal of a gyroscope sensor. It is, therefore, desirable to provide an improved procedure and apparatus for extracting signals to overcome most, if not all, of the preceding problems. It would also be of benefit to provide real-time fault detection of all parts of a gyroscope sensor.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the broad scope of the invention as defined by the appended claims.

DETAILED DESCRIPTION OF THE PREFERRED EMBODIMENTS

What is described is an improved procedure and device for conditioning signals in an electronic sensor such as a gyroscope in order to obtain more accurate angular rate information. The angular rate information can indicate abnormal rotational yaw, pitch, and tilt motions in a vehicle, such as in a rollover accident, for example. Angular information can be provided for rotations about the x, y and z-axes of any assembly given a gyroscope for each axis. The present invention also includes fault detection for a gyroscope, which can be an important aspect for vehicular applications.

To this end, in one embodiment there is a method for extracting components from signals in an electronic sensor having a sensing element. The sensing element generates a first signal and a second signal. The method comprises the steps of: receiving the first signal from the sensing element, the first signal having a frequency at an event; sampling the second signal from the sensing element based on the frequency of the event, the second signal having a plurality of components, one of the plurality of components being a first component of interest; generating a synchronized second signal in a time domain, the second signal having the plurality of components; generating complex data in a frequency domain from the synchronized second signal in the time domain; determining the first component of interest from the complex data; and normalizing the first component of interest using amplitude information from the first signal.

The plurality of components may further include a second component of interest. The method would then further comprise the step of determining the second component of interest from the complex data. The step of receiving the first signal from the sensing element may include receiving the first signal in a phase locked loop. The step of sampling the second signal from the sensing element may include sampling the second signal by an analog-to-digital converter. The sampling may further be done so that the sampling of the second signal is at a multiple of the frequency of the event. The step of generating complex data in the frequency domain may be done through the use of a Fourier Transform. The method may further include a step of determining a reported component of interest from the first component of interest wherein the reported component of interest is determined based on a predetermined offset of the first component of interest.

In another embodiment, there is a method for extracting an angular rate in a gyroscope sensor having a sensing element with a pair of proof masses. The method comprises the steps of: receiving a first signal from the sensing element, the first signal representative of a first movement of the proof masses in a first plane; receiving a second signal from the sensing element, the second signal representative of a second movement of the proof masses in a second plane; sampling the second signal from the sensing element based on the frequency of the first signal; generating a synchronized second signal in a time domain, the synchronized second signal including a plurality of components, one of the plurality of components being the angular rate; generating complex data in a frequency domain from the synchronized second signal in the time domain, the complex data including a plurality of components; determining the angular rate from the complex data; and normalizing the angular rate using amplitude information from the first signal.

There is also a system in an electronic sensor for extracting components of interest from signals. The system comprising a sensor element; a phase locked loop, a signal sampler, a spectrum analyzer, and a decoder. The sensor element reports a first signal and a second signal. The first signal has a frequency at an event. The phase locked loop receives the first signal and determines the frequency of the event. The signal sampler receives the second signal and generates a synchronized second signal in a time domain. The signal sampler is also capable of sampling the second signal based on the frequency of the event determined by the phase locked loop. The spectrum analyzer receives the synchronized second signal in the time domain and generates complex data in a frequency domain. The decoder receives the complex data in the frequency domain and generates a first component of interest from the complex data. A scaling unit divides the first component of interest by a measured value of the oscillator amplitude to normalize the first component of interest.

In one embodiment, the system includes a gyroscope where the sensor element has at least a pair of movable proof masses, the first signal and the second signal are indicative of the oscillatory movement of the proof masses, and the first component of interest is an angular rate of the sensing element. The decoder may further generate a second component of interest such as a quadrature of the proof masses. The signal sampler may be an analog-to-digital converter. The signal sampler may further sample the second signal based on a multiple of the frequency of the event determined by the phase locked loop. The spectrum analyzer may generate the complex data using a Fourier Transform. The scaling unit may be configured to generate a reported component of interest from a calculated component of interest based on a predetermined offset.

In another embodiment, one or more test signals are injected into the drive signal to the sensor element to detect fault conditions. The test signals are of an independent amplitude and frequency from the drive signal so that they can be easily distinguished. A first test signal is superimposed upon an amplitude reference that is used to drive the motor to a desired frequency and amplitude. This first test signal appears in an x-axis feedback signal of the sensor element. Preferably, a second test signal is superimposed upon a bias reference of a quadrature signal of the sensor element. This second test signal appears in a y-axis feedback signal of the sensor element. A fault detector observes a feedback signal(s) from the element to determine if the test signal(s) is present in a close form to the injected test signal(s). If the test signal(s) is not present or does not substantially match the injected test signal(s), then a fault is indicated. The first test signal can also be subtracted from the reported angular rate using the scaling unit as described herein. The injection and detection of the test signal(s) can be done continuously.

Figure 2:
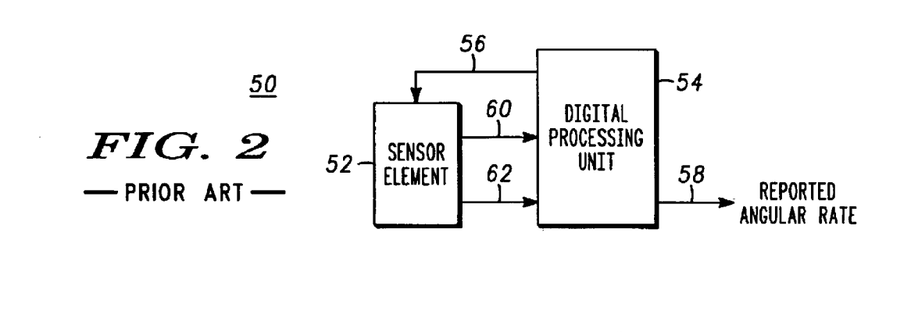
FIG. 2 is a high-level block diagram of one embodiment of an electronic sensor of the present invention.

Now, turning to the drawings, FIG. 2 illustrates one embodiment of an electronic sensor 50 having a sensor element 52 and digital processing unit 54. To illustrate the present invention, a micro gyroscope sensor will be used as an exemplary embodiment of the electronic sensor 50. As one of ordinary skill in the art with the benefit of this disclosure will realize, however, the methods and devices of the present invention could be used in other types of electronic sensors and devices.

In one embodiment, the digital processing unit 54 may be implemented in a digital signal processor (DSP) controller that includes a number of functional blocks as described in more detail below. Generally, in one embodiment, the digital processing unit 54 may control the movement of proof masses of the sensor element 52 in one plane by sending a motor drive signal 56 to the sensor element 52. Alternatively, a separate analog system could be used to control the movement of the proof masses of the sensor element 52 as should be realized by those of ordinary skill in the art. In addition, an application specific integrated circuit (ASIC) could be used alone or together with one or both of the analog and digital systems to implement the present invention. The digital processing unit 54 may also extract and report an angular rate 58 that is reflective of the angular rate that is externally induced to the sensor element 52. To extract and report the angular rate 58, the present invention uses the digital processing unit 54 to receive a first signal 60 and a second signal 62 from the sensor element 52. As will be described further below, the first signal 60 is reported from sensing electrodes that are in the same plane as the proof masses. The second signal 62 is reported from sensing electrodes that are not in the same plane as the proof masses.

Figure 3:
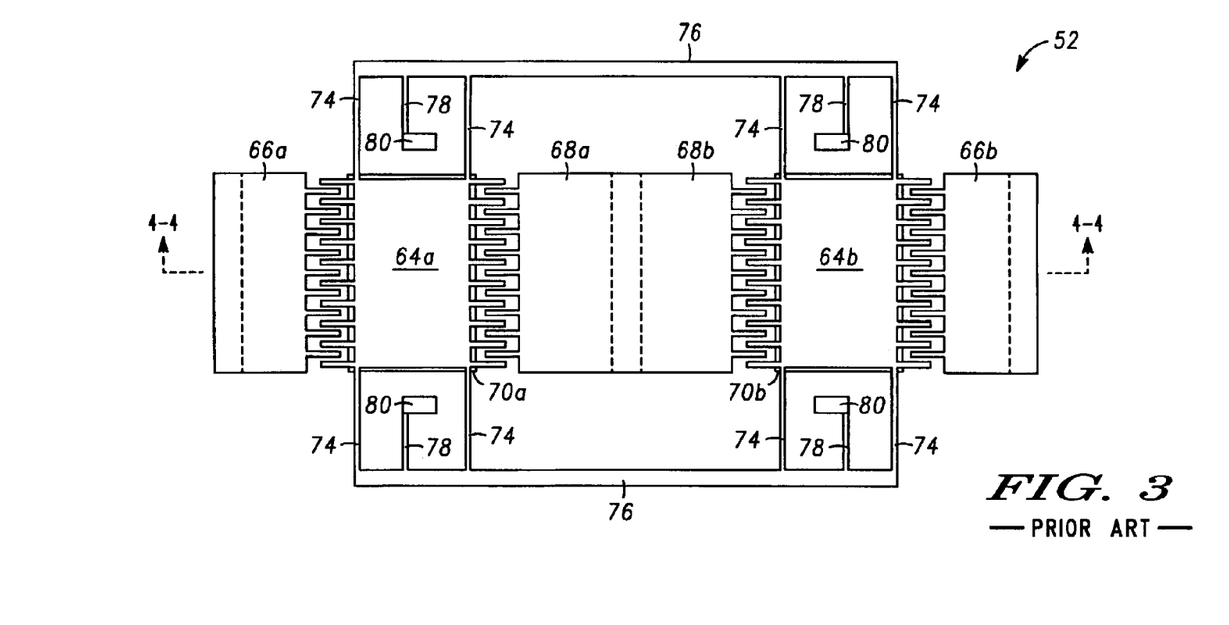
FIG. 3 is a top view of one embodiment of a sensor element of the present invention.
Figure 4:
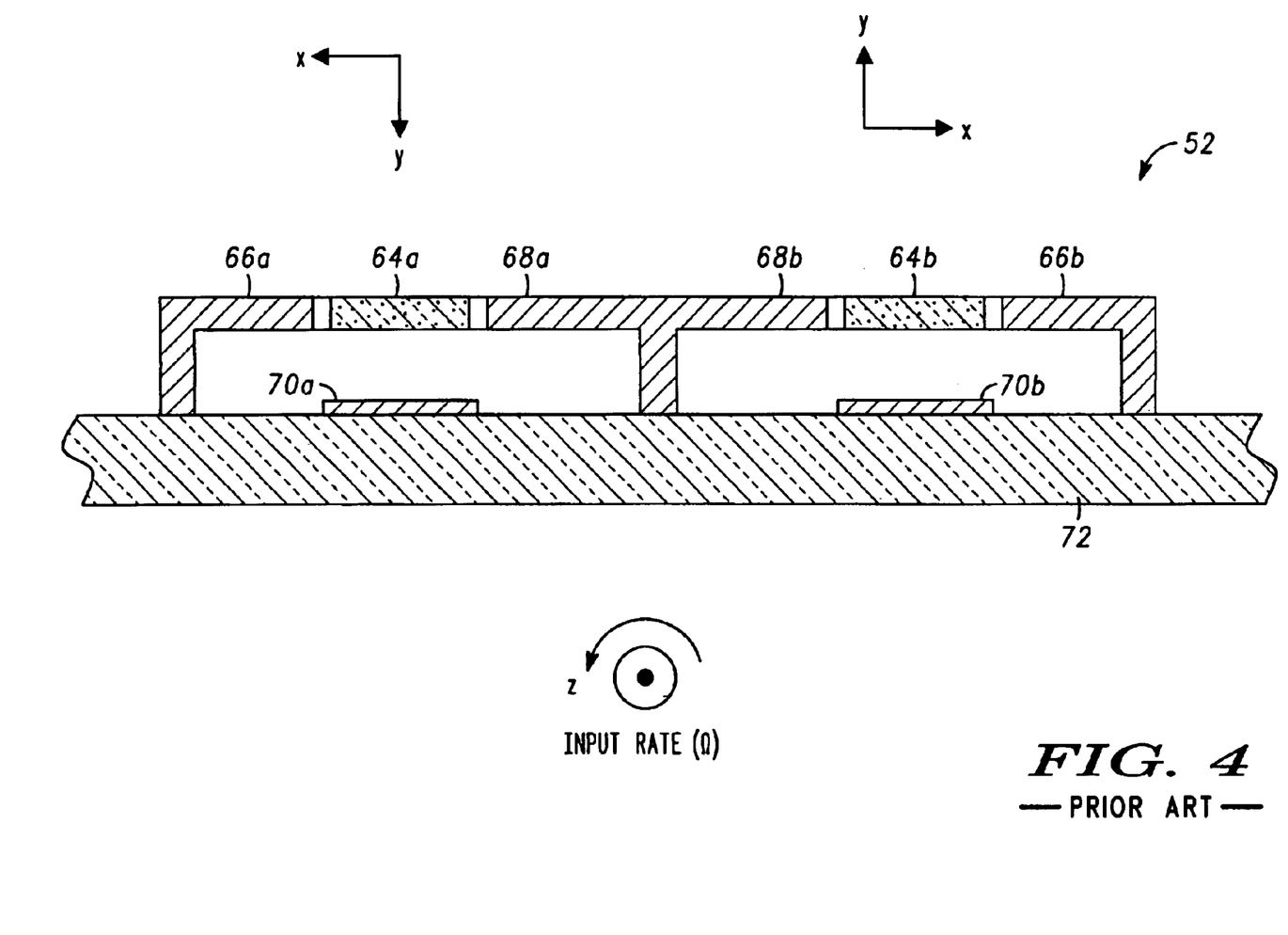
FIG. 4 is a cross-sectional view of the sensor element in FIG. 3 along lines 4—4.

Referring to FIGS. 3 and 4, the sensor element 52 is preferably manufactured out of silicon using known MEMS techniques. The sensor element 52 generally includes a pair of movable proof masses 64a, 64b, a pair of outer combs 66a, 66b, a pair of inner combs 68a, 68b, and a pair of out-of-plane sensing electrodes 70a, 70a. FIG. 3 is a top view of the sensor element 52 and FIG. 4 is a cross sectional view of the sensor element 52. The components of the sensor element 52 are mounted to a substrate 72 (not shown in FIG. 3) and, preferably, housed within a vacuum-sealed cavity (not shown).

As illustrated in FIG. 3, the pair of proof masses 64a, 64b are attached to a series of drive beams 74, base beams 76, and torsion beams 78. The beams 74, 76, 78 permit the proof masses 64a, 64b to move in relation to a series of anchor points 80. The anchor points are rigidly attached to the substrate 72. The proof masses 64a, 64b are permitted to move in at least two planes. The first plane (in-plane) is defined by an x-axis as shown in FIG. 4. The second plane (out-of-plane) is defined by a y-axis.

The pair of outer combs 66a, 66b are electrodes that electrostatically drive the proof masses 64a, 64b in the first plane defined by the x-axis. The proof masses oscillate 180° out-of-phase with respect to each other. The pair of outer combs 66a, 66b may be mounted to the substrate 72. The outer combs 66a, 66b are driven by the motor drive signal 56 generated by the digital processing 54 or, alternatively, through a separate analog system or ASIC. The drive signal 56 is generated in a closed loop manner to oscillate the proof masses 64a, 64b at a frequency near the resonance frequency of the proof masses 64a, 64b.

The pair of inner combs 68a, 68b are in the same plane as the proof masses 64a, 64b. The pair of inner combs 68a, 68b may be mounted to the substrate 72. The pair of inner combs 68a, 68b may be electrodes that electrostatically sense the movement of the proof masses 64a, 64b in the x-axis. The pair of inner combs 68a, 68b are used to report the first signal 60 to the digital processing unit 54. It should be recognized that the roles of driver and sensor could be interchanged between combs 66 and 68.

The pair of out-of-plane sensing electrodes 70a, 70b electrostatically sense the out-of-plane movement of the proof masses 64a, 64b. The pair of out-of-plane sensing electrodes 70a, 70b may be positioned beneath the pair of proof masses 64a, 64b. The pair of out-of-plane sensing electrodes 70a, 70b are used to report the second signal 62 to the digital processing unit 54. As will be described in more detail below, the second signal 62 contains an angular rate component that reflects the angular rate externally induced to the sensor element 52. The second signal 62 is representative of the movement of the proof masses 64a, 64b in the y-axis caused by an externally induced rotational rate in the z-axis. This is shown in FIG. 4 as input rate $\Omega$. As will be explained in more detail below, the digital processing unit 54 receives the second signal 62 and extracts the angular rate component to report the angular rate 58.

Figure 5:
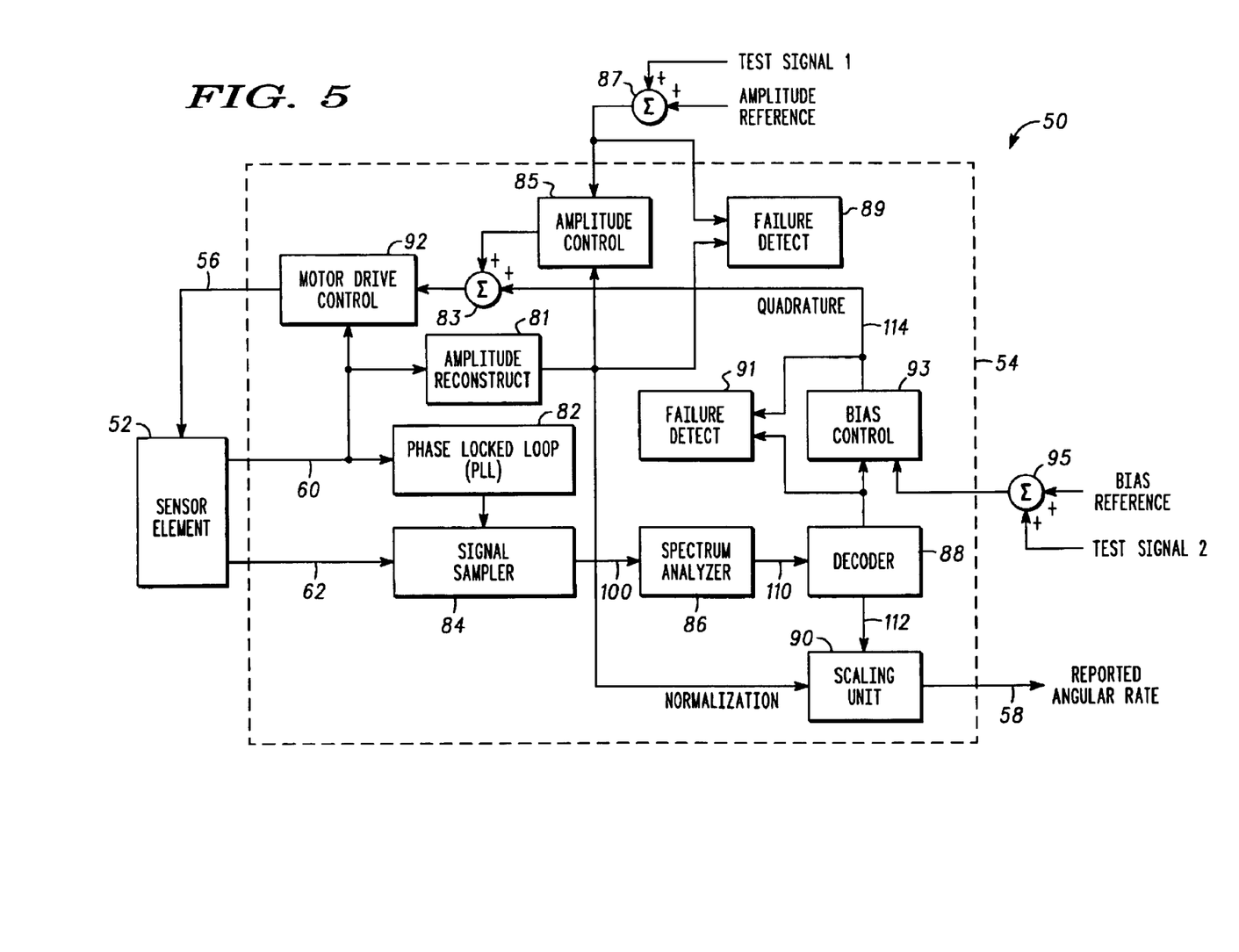
FIG. 5 is a block diagram of one embodiment of an electronic sensor of the present invention.

As mentioned above, the digital processing unit 54 may be implemented in a digital signal processor (DSP) controller containing several functional blocks. Referring to FIG. 5, in one embodiment, the digital processing unit 54 may generally include a phase locked loop 82, a signal sampler 84, spectrum analyzer 86, a decoder 88, and a scaling unit 90. The digital processing unit 54 may further include a motor drive electronics 92 for controlling the oscillation of the proof masses 64a, 64b in the x-axis. Alternatively, the motor drive electronics 92 could be implemented using an external system using techniques known in the art. These functional blocks may be microcoded signal processing steps that are programmed as operating instructions in the digital processing unit 54 or ASIC.

In one embodiment, the digital processing unit 54 receives the first signal 60 for input into the motor drive electronics 92 and the phase locked loop 82. The motor drive control unit uses the first signal 60 in a closed control loop to produce a motor drive signal 56 for the sensor element 52. The motor in the sensor element 52 should be driven at a frequency of f/2. Due to electromechanical interaction of the sensor element 52 with the excitation, the sensor element 52 will then oscillate at a frequency f. The goal of the motor drive electronics 92 is to maintain constant amplitude along the x-axis at the proof masses' 64a, 64b resonance frequency $f_{RES}$. In a design similar to that shown in FIGS. 3 and 4, in one embodiment, the resonance frequency $f_{RES}$ is in the range of about 15 kHz $\leq f_{RES} \leq$ 22 kHz.

To achieve excitation and operation at resonance frequency $f_{RES}$ of the proof masses 64a, 64b, a separate phase locked loop may be used in the motor drive electronics 92 to detect and match the resonance frequency of the element. The phase locked loop would be used to drive the frequency of the excitation at $f_{RES}/2$. A control loop in the motor drive electronics 92 is used to control the amplitude of the drive signal 56.

The digital processing unit 54 uses the second signal 62 to extract an angular rate component for the reported angular rate 58. As mentioned above, the motion of the proof masses 64a, 64b in the y-axis is reported to the digital processing unit through the second signal 62 by the out-of-plane sensing electrodes 70a, 70b. The motion in the y-axis includes at least two main components: (1) a quadrature component caused from the motor drive signal in the x-axis; and (2) an angular rate component caused by a rotational input around the z-axis causing motion in the y-axis via the Coriolis effect. The quadrature component from the x-axis motion is in-phase with the x-axis. The motion induced by the z-axis rotation is offset by ninety-degrees.

The second signal 62 will typically include other extraneous components such as the motor drive capacitive feedthrough and other resonance and noise sources. Examples of the reported motion from each of the two out-of-plane sensing electrodes are shown in the charts in FIGS. 6 and 7. These charts illustrate some of the data observed during a test where the sensor element 52 was subjected to an angular rate of between −100°/sec to +100°/sec in 25°/sec increments. For purposes of illustration and clarity, only three of the increments are shown in the charts in FIGS. 6 and 7. Each chart represents the motion reported by one of the out-of-plane sensing electrodes 70a, 70b in the y-axis.

Figure 6:
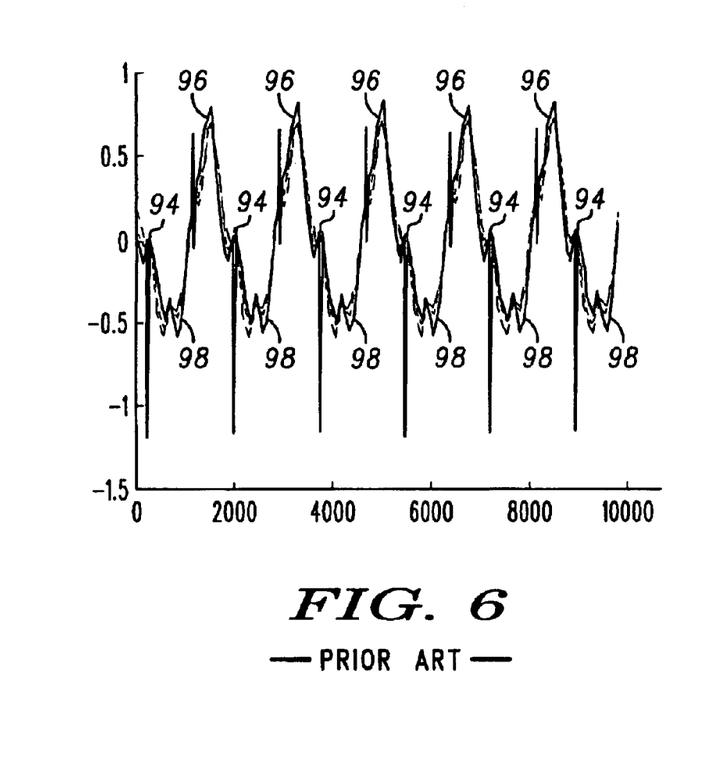
FIGS. 6 and 7 are charts of the outputs from sensing electrodes of the sensor element in FIG. 3 at different input angular rates in the time domain.
Figure 7:
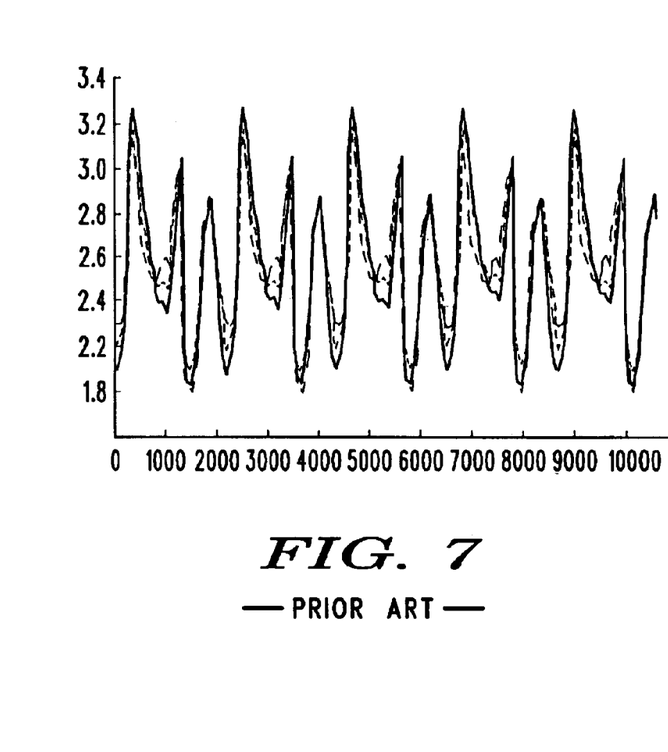

In FIG. 6, the main sinusoid that is observed is actually drive signal feedthrough at $f_{RES}/2$. The signals of interest are in the humps of the waveform. The humps are visible at points 94 (near the center of the signal) and at points 96, 98 (at the peaks and valleys of the signal). In FIG. 7, the drive signal feedthrough is very pronounced as a sharp change in the waveform. The signal not only has a large component at $f_{RES}/2$, but also at the harmonics at $3f_{RES}/2$, $5f_{RES}/2$, $7f_{RES}/2$, and so on.

In one embodiment, an angular rate component is extracted from the second signal 62 through the use of the phase locked loop 82, the signal sampler 84, the spectrum analyzer 86, the decoder 88, and the scaling unit 90.

In one embodiment, the signal sampler 84 takes samples of the second signal 62 and converts the second signal 62 to a format acceptable for further processing in the digital processing unit 54. For example, the signal sampler 84 samples the second signal 62 and converts it to a digital signal. In one embodiment, the signal sampler 84 includes components such as an amplifier and an analog-to-digital (A/D) converter. Although the signal sampler 84 in FIG. 5 is shown as part of the digital processing unit 54, the components could also be a separate unit that provides a direct input to other components of the digital processing unit 54.

In one aspect of the present invention, the phase locked loop 82 is used to adapt the sampling frequency of the signal sampler 84 to the sensor element 52. In other words, the output of the phase locked loop 82 is used to synchronize the second signal 62 for a particular resonance frequency of the proof masses 64a, 64b. If the signal sampler 84 includes an analog-to-digital converter, then the analog-to-digital converter measures and samples the voltage signal based on an input from the phase locked loop 82. In a preferred embodiment, the second signal 62 is oversampled based on the resonance frequency of the proof masses 64a, 64b. For example, the signal sampler 84 can be set to oversample at a multiple of the resonance frequency such as $8f_{RES}$. This enables the collection of 128 samples. If the resonance frequency range of the sensor element is 15 kHz $\leq f_{RES} \leq$ 22 kHz, this results in a sample range of between 0.727 to 1.066 ms. The main calculation, control, and reporting loop would then be at about 2.0 ms. The signal sampler 84 could be set to other oversample rates such as $4f_{RES}$ or $16f_{RES}$.

The output of the signal sampler 84 is a digital synchronized second signal 100 and will be a function of time. The synchronized second signal 100 generated by the signal sampler 84 will include a composite of signals including a quadrature component and an angular rate component. Other components of the sampled signal may include motor drive feedthrough and other system resonance and noise.

In the preferred embodiment of the present invention, the synchronized second signal 100 (in the time domain) is converted to a frequency domain through the use of the spectrum analyzer 86. In one embodiment, the spectrum analyzer 86 uses DSP based techniques to implement a Fast Fourier Transform (FFT) and, in particular, a Discrete Fourier Transform (DFT). The DFT is a suitable technique for the spectrum analyzer because it applies a mathematical technique for resolving time domain functions into a frequency spectrum.

Figure 8:
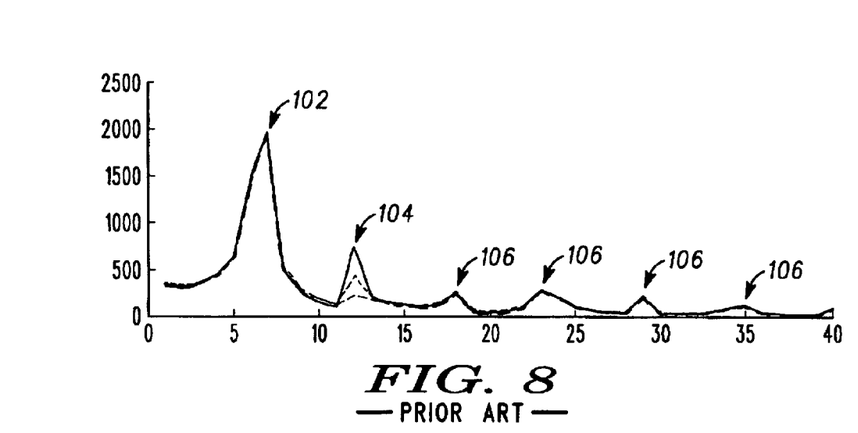
FIG. 8 is a chart of the outputs in FIG. 7 in the frequency domain.

Generally, a spectrum analyzer can decompose or separate a waveform or function into sinusoids of different frequency that sum to the original waveform. In other words, it identifies or distinguishes the different frequency sinusoids and their respective amplitudes. In this case, for example, applying the second signal 62 shown in FIG. 7 through the spectrum analyzer of this invention will result in spectra similar to that shown in FIG. 8. In this case, the first set of peaks 102 is representative of the capacitively-coupled motor drive feedthrough component of the second signal 62. The second set of peaks 104 is representative of two combined components—the quadrature component and the angular rate component—of the second signal 62. It is important to note that the amplitude of the second set of peaks 104 vary according to the magnitude of the angular rate that was externally applied to the sensing element 52. As can be seen, differences exist in the height of the peaks between the three plots taken for different angular rates. The third, fourth, fifth, and sixth set of peaks 106 are representative of the resonance of the motor drive feedthrough of the second signal 62. Any higher peaks (not shown) are further resonance and noise components of the second signal 62 in the system.

Generally performing a Fourier transform over an entire frequency spectrum of interest in this case would require a lot of computation time to search for a particular frequency of interest. For example, as mentioned above, the general range of interest found in one embodiment of the sensor element 52 was a range of 15 kHz≦$f_{RES}$≦22 kHz, the range of the resonant frequency of the proof masses.

Thus, in the embodiment, as mentioned above, the present invention uses the phase locked loop 82 for the first signal 60 to adapt the sampling frequency of the signal sampler 84. This enables the system to advantageously use an event-based sampling method instead of a time-based sampling method. In other words, the use of the phase locked loop 82 as part of the sampling clock of the signal sampler 84 allows the present system to reject the off-frequency components and separate the two combined components (quadrature and angular rate) occurring at the same frequency. Sampling the second signal 62 in this way provides several advantages. First, the signals of interest will always be at the same point in the event-based frequency spectrum. This eliminates additional computation time in searching for the frequency of interest due to slight variations between sensor elements. Second, by sampling the signal at specific events of the waveform, the quadrature component and the angular rate components of the second signal can be separated out and measured individually.

The spectrum analyzer 86 is used to determine the amplitude and the phase of the synchronized second signal 100. If using a Discrete Fourier Transform, the general transform is in the following form of equation (1).

$$X(k) = \sum_{n=1}^{N} x(n) \exp\left[-j2\pi \frac{(k-1)(n-1)}{N}\right] \text{ for } 1 \leq k \geq N \quad (1)$$

In the present invention, however, using the event-based sampling method mentioned above, X(k) only needs to be calculated at a single point instead of N points. The result of the DFT would then be a complex number in the form of equation (2).

$$X = X_{REAL} + jX_{COMPLEX} \quad (2)$$

Accordingly, in one embodiment, the output of the spectrum analyzer 86 is complex data 110 as shown in FIG. 5. The complex data 110 is a summation of the two components at the selected frequency: the angular rate component and the quadrature component. The output of the spectrum analyzer 86 may then be inputted into the decoder 88.

The decoder 88 determines a calculated angular rate component 112 and a calculated quadrature rate component 114 from the complex data 110 received from the spectrum analyzer 86. As mentioned above, in one embodiment of the present invention, the complex data 110 is a summation of the two components at the event-based frequency. The two signal components are offset physically by ninety-degrees from each other and, using the system and method described above, the components of the complex data 110 will also be ninety-degrees from each other.

Figure 9:
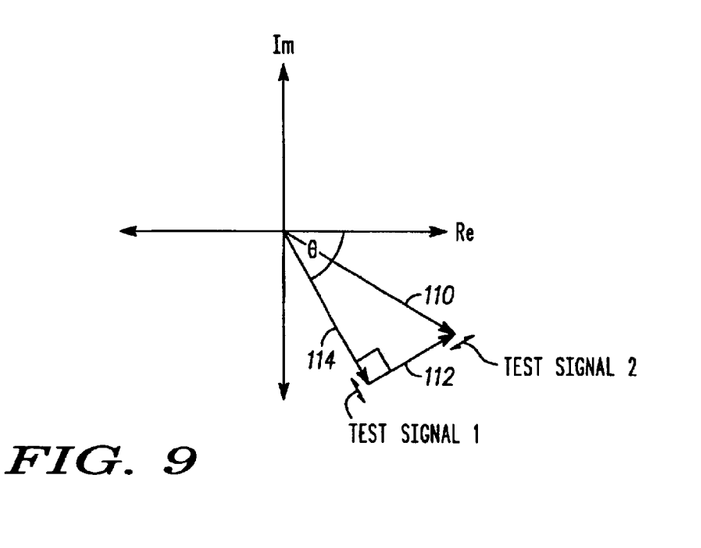
FIG. 9 is a diagram of a signal from the sensor element and its components in the frequency domain.

In other words, the decoder 88 can break down the complex data 110 into its angular rate component and its quadrature component. This is illustrated further in relation to the diagram in FIG. 9. The angle θ is constant due to the event-based sampling method described above. To obtain a calculated angular rate component 112 and the quadrature component 114 from the complex data 110, an angular project/rotation is used having a formula like the one in equation (3).

$$\begin{bmatrix} \text{QUADRATURE} \\ \text{ANGULAR RATE} \end{bmatrix} = \begin{bmatrix} \cos\theta & \sin\theta \\ -\sin\theta & \cos\theta \end{bmatrix} \begin{bmatrix} X_{REAL} \\ X_{COMPLEX} \end{bmatrix} \quad (3)$$

The decoder 88 has outputs to generate two components of interest: a calculated angular rate component 112 and a calculated quadrature component 114. The calculated angular rate component 112 may be reported externally from the digital processing unit 54. Preferably, as described further below, the calculated angular rate component 112 can be sent to a scaling unit 90 for further processing. The calculated quadrature component 114 may be sent to the motor drive electronics 92 to assist in generating the drive signal 56.

Figure 10:
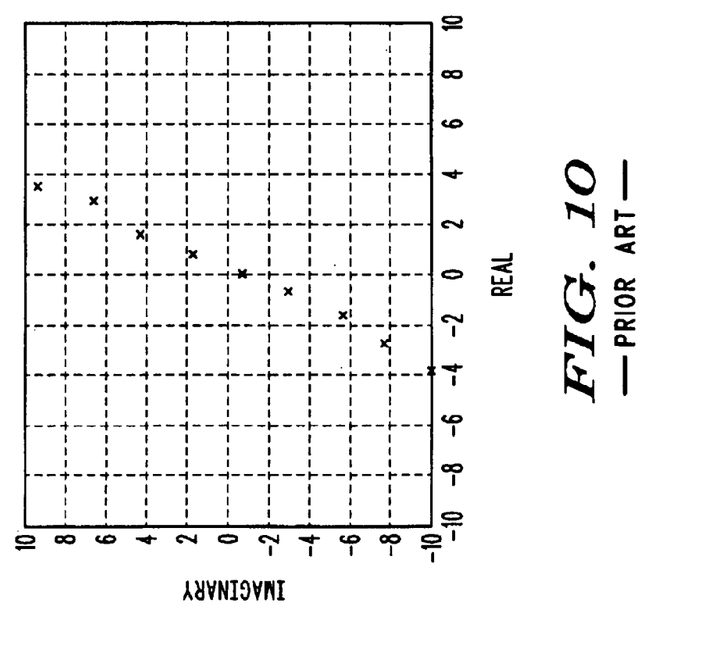
FIG. 10 is a graph of experimental data obtained from the sensor element.

It has been found that for systems with a relatively fixed quadrature value and varying angular rate, the calculated angular rate component 112 from the decoder 88 for a single frequency over different angular rates generally end up in the form of a line. This is illustrated in FIG. 10 that shows data obtained from one of the out-of-plane sensing electrodes 70a, 70b during an experiment. It may be important to note that in some applications a variation may occur that results in points that do not form a straight line. This may result from the fact that the quadrature component may actually vary between tests.

Accordingly, in one embodiment of the present invention, the digital processing unit 54 further includes the scaling unit 90 to convert the calculated angular rate component 112 to a reported angular rate 58. The reported angular rate 58 can then be outputted from the digital processing unit 54.

Figure 11:
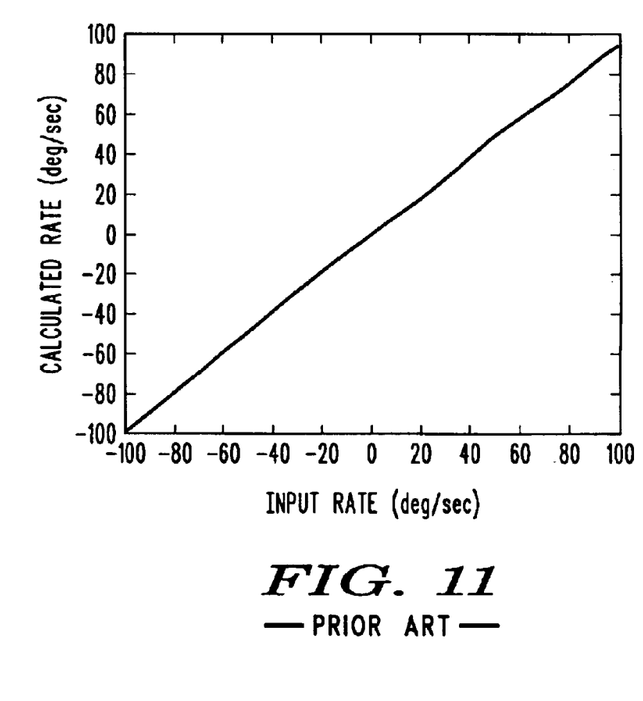
FIG. 11 is another graph of experimental data plotting a calculated angular rate versus an input angular rate.

The scaling unit 90 may be implemented in a number of ways. FIG. 11 illustrates one example of a graph that can be used in converting the calculated angular rate signal 112 to a reported angular rate 58. The graph shows calculated angular rate versus input angular rate. The graph in FIG. 11 was obtained through experiential data from a sensor element similar to the one shown in FIGS. 3 and 4. A similar graph could be prepared for different sensors. This data may be used to determine an offset to the calculated angular rate signal 112. An offset may be needed in some applications where a measurement error is present due to a particular sampling method or due to other the manufacturing errors in the sensor element 52. If an offset is used, a suitable formula for applying the offset is in equation (4).

$$\begin{bmatrix} \text{QUADRATURE} \\ \text{ANGULAR RATE} \end{bmatrix} = \begin{bmatrix} \cos\theta & \sin\theta \\ -\sin\theta & \cos\theta \end{bmatrix} \begin{bmatrix} X_{REAL} \\ X_{COMPLEX} \end{bmatrix} + \quad (4)$$

-continued $$\begin{bmatrix} \text{cal\_offset\_1} \\ \text{cal\_offset\_2} \end{bmatrix}$$

Figure 12:
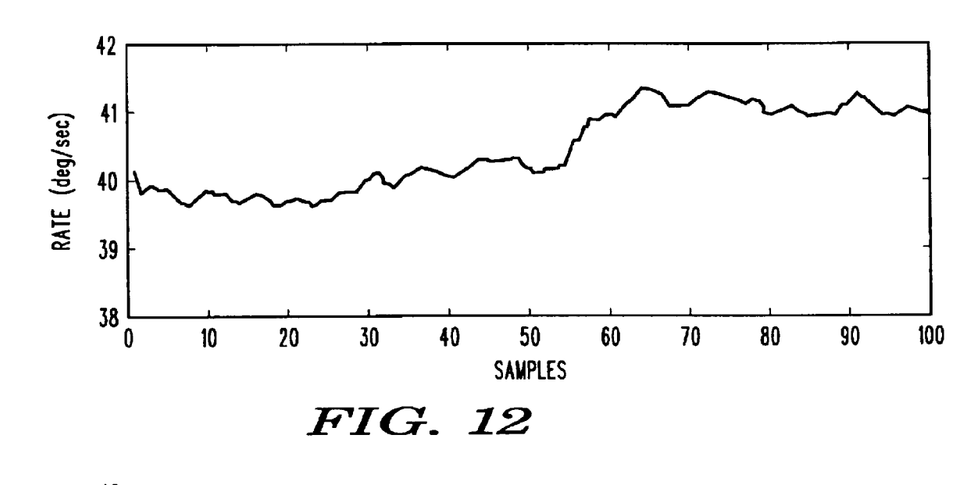
FIG. 12 is a graph of experimental angular rate data from the sensor obtained over one-hundred samples.

It has also been found that angular rate sensors are vulnerable to disturbances from road conditions or parameter drift. Normally it is desired to maintain a constant amplitude of oscillation of the proof masses of the sensor. However, when a disturbance or parameter changes affect the amplitude of oscillation of the angular rate sensor, the resultant change in the calculated angular rate component 112 due to the Coriolis effect may be improperly interpreted as a change in the angular rate of the vehicle itself. This is illustrated in FIG. 12 that reported angular rate data obtained during an experiment over one-hundred samples calculated every 2 ms. The motor oscillation amplitude is increased 2.5% between samples 50 and 60 to simulate an increase in the motor oscillation due to a disturbance. As can be seen, the reported angular rate incorrectly increases as the motor amplitude increases, leading to errors in reported angular rates.

The calculated angular rate component 112 is based on the parameters of: the electronics (which can be calibrated out), the velocity of the proof masses (read as the amplitude of oscillation), and the actual angular rate applied to the sensor. Accordingly, in a preferred embodiment of the present invention, to cancel the effects of the disturbances and parameter drift, the measured angular rate (actually read as an amplitude of the sense axis) is divided by the measured value of the oscillation amplitude in the scaling unit 90, thereby normalizing the signal when external factors affect the proof mass oscillation. This normalized output can then be passed through a filter such as a low pass filter in the scaling unit 90 before the reported angular rate 58 is output from the digital processing unit 54.

In particular, and referring back to FIG. 5, a preferred embodiment of the present invention includes an amplitude reconstruction block 81 and an amplitude control 85. These additional blocks can be implemented via an analog or digital control scheme. The amplitude reconstruction block can include a sigma-delta converter and an oversampling function. The amplitude reconstruction block uses the first signal 60 from the sensor element 52 and provides a reconstruction of the actual amplitude of the proof masses. The amplitude control block 85 uses this reconstructed amplitude of the actual oscillation of the sensor and compares it to a desired amplitude reference or AGC control. The purpose of the amplitude control is to then drive the sensor element, through the motor drive electronics 92, to a constant operating frequency and amplitude. The reconstructed actual amplitude is also provided to the scaling unit 90 where the measured angular rate (actually read as an amplitude of the sense axis) is divided by the reconstructed amplitude for normalization to provide a more accurate reported angular rate output. Optionally, a bias control 93 is also provided to use the rate information from the decoder 88 and a bias reference to maintain the sensor rate around a zero point (i.e. no rate offset).

In review, when an angular rate is applied to the sensor about the Z-axis, the oscillatory motion of the sensor in the X-axis will generate an acceleration in the Y-axis. This is governed by $$a = \omega \times v$$

where a is the Coriolis acceleration defined as the cross product of, $\omega$, the angular rate of coordinate system (in this case—angular rate applied to sensor) and v, the velocity of proof masses. The Coriolis effect will produce acceleration in the Y-axis of the sensor due to the angular rate input as well as the oscillation in the X-axis. As a cross product, the Coriolis acceleration is 90° out of phase with the oscillation of the proof masses of the sensor.

Since the proof masses are in sinusoidal motion, the position of the proof mass in the X-axis can be defined as $$x = A \sin(\omega_x t)$$

where A is the amplitude of motion (controlled to be nearly a constant) and $\omega_x$ is the frequency of oscillation of proof mass. The velocity then becomes $$v_x = \frac{d}{dt} A \sin(\omega_x t) = A \omega_x \cos(\omega_x t) + \frac{dA}{dt} \sin(\omega_x t)$$

Analytically it has been found that $$\frac{dA}{dt} \sin(\omega_x t) \approx 0$$

which leaves $$v_x \approx A \omega_x \cos(\omega_x t)$$

The magnitude of the velocity is then $$|v_x| = A \omega_x$$

The Coriolis acceleration at steady-state will produce a sinusoidal signal of the same frequency as the proof mass oscillation frequency as follows:

$$a_Y = \frac{d^2}{dt^2} B \cos(\omega_x t) = B \omega_x^2 \cos(\omega_x t) + \text{Higher\_Order\_Terms}$$

It has also been found analytically that the higher order terms are small enough to ignore, therefore we are left with the magnitude of the Coriolis acceleration of $$|a_y| = B \omega_x^2$$

Substituting terms back into the original cross product formulation, we have $$\omega \propto \frac{a_Y}{v_X}$$

or $$\omega \propto \frac{B \omega_X^2}{A \omega_X}$$

and as a result $$\omega \propto \frac{B}{A}$$

Therefore, instead of needing to calculate out the acceleration and velocity in the Y and X axes respectively, the amplitudes of oscillation are sufficient to determine the angular rate applied to the sensor.

Typically, the angular rate of gyroscopic sensors is filtered to calculate the rate from the Y-axis motion in some manner and put it through a filtering scheme, generally such as a low order low pass filter. The problem with this, however, is that when the sensor is placed on a system with large disturbances, such as a vehicle, the vibration disturbances may translate to disturbances in the amplitude of the X-axis oscillation. This results in a skewing of the calculated rate signal calculated by the sensor. If the oscillation amplitude increases then the calculated rate will increase even though the actual angular rate will not have changed. Also, if the angular rate decreases, the calculated rate will decrease in the same manner even though the actual angular rate will not have changed. However, it has been found that low pass filtering is generally insufficient to remove these disturbances.

Figure 13:
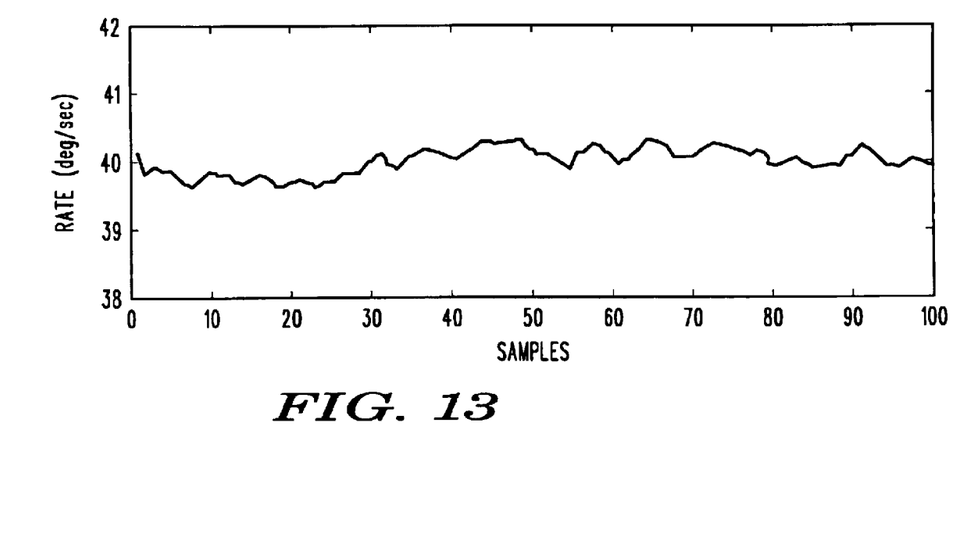
FIG. 13 is a graph of the experimental amplitude data from FIG. 12 normalized in accordance with a preferred embodiment of the present invention.

Therefore, the present invention provides for normalization by taking the calculated rate output from the sensor and dividing it by the amplitude of the oscillation in accordance with the previous finding that ω is proportional to B/A. In this manner, the disturbances or drift of the oscillation amplitude are removed from the calculated rate signal. The calculated rate can then be filtered (normally low pass) before the angular rate is reported by the sensor. FIG. 13 illustrates that the reported angular rate data obtained using the same experiment as in FIG. 12, wherein the motor oscillation amplitude is increased 2.5% between samples 50 and 60 to simulate an increase in the motor oscillation due to a disturbance. As can be seen, the reported angular rate stays level as the motor amplitude increases, demonstrating an increased accuracy in reported angular rates.

It has also been found that gyroscopic sensors are subject to various fault modes. Inasmuch as angular rate sensors can be used for safety critical systems, there is a need to continuously monitor the functionality of the whole sensor, including the sensor element, DSP, ASIC's, electronics, and software in order to ensure proper operation at all times. It is generally undesirable to take a sensor offline to perform diagnostic tests.

Therefore, a more preferred embodiment of the present invention provides real-time diagnostic techniques to monitor all parts of the sensor. This more preferred embodiment injects test signals (generally a low frequency sinusoid) into the reference level of the proof mass oscillation amplitude and the bias signal. The effect of the bias voltage variance will be measured as quadrature. This is used to ensure that the bias generation circuitry, sense axis electronics, and control algorithms are working properly. The effect of the oscillation reference will show up as a measured angular rate variance which is nullified by dividing the measured rate by the amplitude of the proof mass oscillation as is done in the previously described preferred embodiment. As a result, changes in the bias voltage applied to the sensor will only result in changes in the sense axis quadrature, not the measured angular rate. Each of these tests is run continuously, thus avoiding the need to halt sensor operation to perform diagnostics.

Referring back to FIG. 5, and as described before, the main control loop of the DSP is 2 ms defined as a "DSP Calculation Cycle". During this time, multiple measurements are taken to determine the motor and rate amplitude, and calculations are performed to set various control parameters. The fault tests to be performed will take place at some multiple of these 2 ms intervals. Fault checks involve active and passive checks.

An active check is one in which a quantity is measured from an output point that is affected by an input test signal. This test signal affects the performance characteristics of the element, and the measured quantity should reflect this test signal. The test signals in these cases are superimposed on a normal operating parameter, such as the motor amplitude reference and the bias reference. Specifically, a test signal such as a sine wave is induced on top of a reference for a desired amplitude and if this sine wave is not seen in feedback, then a fault is indicated. Preferably, two independent test signals are used, a test signal 1 for the amplitude reference and a test signal 2 for the bias reference. The test signals are also independent of the frequency of the amplitude or bias references and do not affect the angular rate signal. As a result, the fault detection in accordance with the present invention can be done real time.

In operation, a test signal 1 is introduced to the desired motor amplitude at summing block 87 as shown. The test signal, which is generally no more than 5% of the desired motor amplitude, is added to a fixed reference value. This has the effect of creating a reference signal of a small sine wave with a larger DC offset. The control loop in the DSP will maintain the actual amplitude of oscillation at this time-varying reference level. Each time the reference completes one cycle, a verification is performed that verifies that the actual motor amplitude has completed a cycle. If the feedback signal from the amplitude reconstruction 81 did not track the reference signal (i.e. a 5% time-varying amplitude) within predetermined amplitude and phase bounds an x-axis fault is indicated by a failure detector 89. This test signal does vary the rate (see FIG. 9). However, normalization, as introduced previously, can remove the test signal to provide the correct rate.

For this x-axis failure mode, one or more of several faults may have occurred including serial peripheral interface (SPI) transmission or reception error, motor drive electronics failure, motor sense electronics failure, Sigma-Delta failure of amplitude reconstruction, or controller algorithm failure (DSP, ASIC, etc.). The controller algorithm failure can be verified by entering a series of known test inputs into the main control loop and comparing the calculation outputs to a known value. The other failures can then be identified individually via test modes. Upon a failure, an error flag is set by the failure detector 89, and the individual tests could be activated.

In addition, a test signal 2 is introduced to the desired bias reference summing block 95 as shown. This test signal 2, is also only a small percentage of the reference bias level and is added to a fixed control value. This has the effect of creating a reference signal of a small sine wave with a larger DC offset. The control loop in the DSP will maintain the actual quadrature at this time-varying reference level. Each time the reference completes one cycle, a verification is performed that verifies that the actual motor amplitude has completed a cycle. If the feedback signal from the decoder 88 did not track the reference signal within a second set of predetermined amplitude and phase bounds, a y-axis fault is indicated by a failure detector 91. This test signal varies the quadrature and does not affect the rate (see FIG. 9).

For this y-axis failure mode, one or more of several faults may have occurred including: SPI transmission or reception error, bias electronics failure, rate sense electronics failure, Sigma-Delta failure, controller algorithm failure. The controller algorithm failure can be verified by entering a series of known test inputs into the bias control loop and comparing the calculation outputs to a known value. The other failures can then be identified individually via test modes. Upon a failure, an error flag is set by the failure detector 91, and the individual tests could be activated.

The active checks of the present invention do not require that the injected test signal have any relationship with the reference signals. In other words the test signals can be phase and amplitude independent from the reference signals.

For example, the test signals can have 5% of the amplitude of the reference signals and have a frequency of about 1 Hz. As a result the present invention does not require the regulation of loop functions or the use of coupling simulations. Moreover, the present invention accommodates all possible failure modes.

The present invention also envisions passive fault checks that can be performed. A passive check is one in which a quantity is measured within the control system and compares it to an expected value. The quantity to be measured may be directly or indirectly controlled by the controller, however, the controller is not actively sending a test signal to check any of these quantities.

For example, one passive test is for the PLL 82, wherein periodically the value of the PLL is read from the frequency input on the DSP, and it must be within a predetermined percentage of the value calibrated at the end of line. Another passive test is for the motor amplitude limit, wherein each time the motor amplitude is checked, its values must lie within some maximum bound. If the bound is reached on consecutive measurements or if a limit is reached on a certain percentage of measurements an error flag is set. Another passive test is for AGC limit, wherein each time the AGC is calculated, a comparison of this value to calibrated maximum and minimum allowable values is performed. If the maximum or minimum value is exceeded by the calculation, the limit value is sent to the controller and an error flag is set. If a limit is reached on consecutive calculations or if a limit is reached on a certain percentage of calculations an error flag is set. This test checks the controller by ensuring that the result of the calculation is within the proper bounds. Another passive test is for bias limit, wherein each time the sense plate bias is calculated, a comparison of this value to calibrated maximum and minimum allowable values is performed. If the maximum or minimum value is exceeded by the calculation, the limit value is sent to the controller and an error flag is set. If a limit is reached on consecutive calculations or if a limit is reached on a certain percentage of calculations an error flag is set. This test checks the DSP by ensuring that the result of the calculation is within the proper bounds.

What has been described is an improved method and system for conditioning the angular rate component from the output signal of an electronic sensor for proper extraction thereof. The method and system eliminates the need for excessive filtering and requires less computation than in the prior art. It improves the accuracy, the speed, and the cost of the electronic sensor. The method and system reduces the effect of the noise spectrum and significantly reduces the effect of the motor drive feedthrough. The method and system makes advantageous use of a Discrete Fourier Transform with an additional use of a phase locked loop to adapt the sampling frequency to the specific electronic sensor. The coefficients for the Discrete Fourier Transform are known a priori based on the phase locked sampling method, the number of samples, and amount of oversampling per waveform. Moreover, the method and system provides an efficient and robust event-based sampling scheme instead of a time-based sampling scheme. Furthermore, the present invention incorporates a way to account for variances between sensor elements through normalization. Even further, the present invention provides fault detection for all fault modes.

The above description of the present invention is intended to be exemplary only and is not intended to limit the scope of any patent issuing from this application. The present invention is intended to be limited only by the broad scope of the following claims.

What is claimed is:

1. A method for signal conditioning in an electronic sensor having a sensing element, the sensing element generating a first signal and a second signal, the method comprising the steps of:
   receiving the first signal from the sensing element, the first signal having a frequency at an event;
   sampling the second signal from the sensing element based on the frequency of the event, the second signal having a plurality of components, one of the plurality of components being a first component of interest;
   generating a synchronized second signal in a time domain, the second signal having the plurality of components;
   generating complex data in a frequency domain from the synchronized second signal in the time domain;
   determining the first component of interest from the complex data; and
   normalizing the first component of interest using amplitude information from the first signal.

2. The method of claim 1, further comprising the steps of:
   driving the sensor element with a drive signal, and
   injecting a first test signal into the drive signal.

3. The method of claim 2, wherein the first test signal has a frequency that is independent of the drive signal.

4. The method of claim 2, wherein the first test signal of the injecting step provides a variation in the first component of interest of the sensor, and further comprising the steps of:
   detecting the first test signal in a first feedback signal from the sensing element;
   indicating a fault if the first test signal in the first feedback signal does not substantial match the first test signal from the injecting step; and
   subtracting the first test signal from the first component of interest.

5. The method of claim 4, wherein the injecting and detecting steps are performed continuously during the operation of the sensor.

6. The method of claim 2, further comprising the steps of:
   injecting a second test signal on a quadrature bias reference of the drive signal;
   detecting the second test signal in a second feedback signal from the sensing element; and
   indicating a fault if the second feedback signal in the second feedback signal does not substantial match the second test signal from the injecting step.

7. The method of claim 6, wherein the second test signal is injected in a bias control of the sensor element and the second test signal has a frequency that is independent of a quadrature frequency.

8. The method of claim 2 wherein the first test signal is injected into an amplitude reference of the sensor element.

9. A method for conditioning an angular rate signal in a gyroscope sensor having a sensing element with a pair of proof masses, the method comprising the steps of:
   receiving a first signal from the sensing element, the first signal representative of a first movement of the proof masses in a first plane;
   receiving a second signal from the sensing element, the second signal representative of a second movement of the proof masses in a second plane;
   sampling the second signal from the sensing element based on the frequency of the first signal;
   generating a synchronized second signal in a time domain, the synchronized second signal including a plurality of components, one of the plurality of components being the angular rate;

generating complex data in a frequency domain from the synchronized second signal in the time domain, the complex data including the plurality of components;

determining the angular rate from the complex data; and normalizing the first angular rate using amplitude information from the first signal.

10. The method of claim 9, further comprising the steps of:

driving the sensor element with a drive signal, and injecting a first test signal into the drive signal, the first test signal having a frequency that is independent of the drive signal.

11. The method of claim 10, wherein the first test signal of the injecting step provides a variation in the first component of interest of the sensor, and further comprising the steps of:

detecting the first test signal in a first feedback signal from the sensing element;

indicating a fault if the first test signal in the first feedback signal does not substantial match the first test signal from the injecting step; and subtracting the first test signal from the first component of interest.

12. The method of claim 11, wherein the injecting and detecting steps are performed continuously during the operation of the sensor.

13. The method of claim 9, further comprising the steps of:

driving the sensor element with a drive signal;

injecting a first test signal on an amplitude reference of the drive signal and a second test signal on a bias reference of the drive signal;

detecting the first test signal in a first feedback signal from the sensing element and the second test signal in a second feedback signal from the sensing element; and indicating a fault if one or more of the first feedback signal in the first feedback signal does not substantial match the first test signal from the injecting step and the second feedback signal in the second feedback signal does not substantial match the second test signal from the injecting step.

14. A signal conditioning system in an electronic sensor, the system comprising:

a sensor element that reports a first signal and a second signal, the first signal having a frequency at an event;

a phase locked loop for receiving the first signal and determining the frequency of the event;

a signal sampler for receiving the second signal and generating a synchronized second signal in a time domain, the signal sampler capable of sampling the second signal based on the frequency of the event determined by the phase locked loop;

a spectrum analyzer for receiving the synchronized second signal in the time domain and generating complex data in a frequency domain;

a decoder for receiving the complex data in the frequency domain and generating a first component of interest, the first component of interest being a component of the complex data in the frequency domain;

a drive signal for driving the sensor element; and a scaling unit that divides the first component of interest by a measured value of the oscillator amplitude to normalize the first component of interest.

15. The system of claim 14, the electronic sensor is a gyroscope, the sensor element having at least a pair of movable proof masses, the first signal and second signal being indicative of oscillatory movement of the proof masses, and the first component of interest being an angular rate of the sensing element.

16. The system of claim 15, further comprising:

a first test signal injected into the drive signal and having a frequency that is independent of the drive signal; and a first feedback signal from the sensor element.

17. The method of claim 16, wherein the first test signal provides a variation in the angular rate of the sensor, and further comprising a failure detector that detects the first test signal in a first feedback signal from the sensing element and indicates a fault if the first test signal in the first feedback signal does not substantial match the first test signal, and wherein the scaling element subtracts the first test signal from the angular rate.

18. The system of claim 15, wherein the first test signal is injected continuously and the failure detector operates continuously during the operation of the sensor.

19. The system of claim 15, further comprising:

a first test signal and a second test signal injected into the drive signal with each test signal having a frequency that is independent of the drive signal;

a first feedback signal and a second feedback signal from the sensor element;

a failure detector that compares the first and second test signals in the respective first and second feedback signals with the respective injected first and second test signals, wherein the failure detector indicates a fault if one or more of the first feedback signal in the first feedback signal does not substantial match the first test signal and the second feedback signal in the second feedback signal does not substantial match the second test signal.

20. The system of claim 19, wherein the first test signal is injected on an amplitude reference of the drive signal and a second test signal is injected on a bias reference of the drive signal.

* * * * *